UNITED STATES PATENT OFFICE.

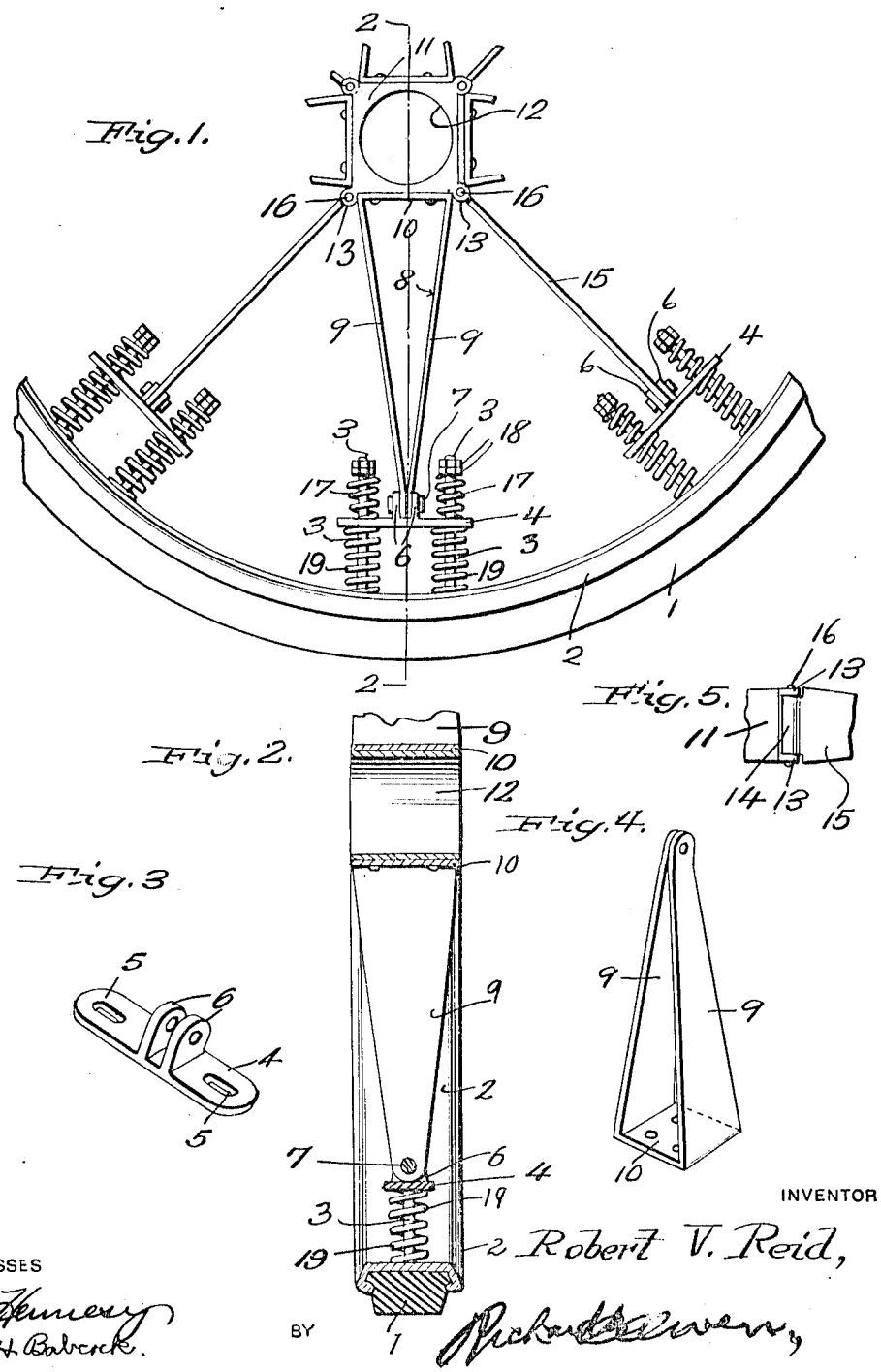

ROBERT V. REID, OF COTTONWOOD, ALABAMA.

RESILIENT WHEEL.

1,274,449.     Specification of Letters Patent.     Patented Aug. 6, 1918.

Application filed November 19, 1917. Serial No. 202,823.

*To all whom it may concern:*

Be it known that I, ROBERT V. REID, a citizen of the United States, residing at Cottonwood, in the county of Houston and State of Alabama, have invented certain new and useful Improvements in Resilient Wheels, of which the following is a specification.

This invention relates to resilient wheels, and more particularly to that type of wheel in which a floating hub is employed.

One of the main objects of the invention is to provide a wheel of the character stated of simple construction and operation which may be produced at small cost. A further object is to provide a wheel the spoke elements of which may be formed by stamping and bending from sheet material of suitable gage so as to effect a saving in cost of production. Another object is to provide a wheel in which the spoke elements may be flexed so as to increase the resiliency of the wheel. Further objects will appear from the detailed description.

In the drawings:

Figure 1 is a fragmentary side view of a wheel constructed in accordance with my invention.

Fig. 2 is a section taken substantially on line 2—2 of Fig. 1.

Fig. 3 is a perspective detail of one of the spoke supporting plates.

Fig. 4 is a perspective detail of one of the main spokes.

Fig. 5 is a fragmentary detail of the mounting of one of the supplemental spokes.

The wheel is provided with a solid rubber tire 1 which is mounted in a rim 2 of the clencher type. This rim is provided with equally spaced pairs of spaced inwardly projecting pins 3 which are secured in the base portion of the rim. These pins slidably receive a substantially rectangular plate 4 which is provided at each end with a longitudinal slot 5 corresponding in width to the diameter of the pin. Plate 4 is provided, at its longitudinal center, with spaced transverse ears 6. These ears have alined bores which receive a securing pin 7 which is also inserted through the outer end of a spoke 8. This spoke is formed by stamping and bending from sheet metal of suitable gage and temper and has the outwardly tapering arms 9 the inner ends of which are connected by the base piece 10 which is substantially square in outline. This base piece is secured to one side of a square hub block 11 having the central cylindrical bore 12 for reception of the axle skein. In the form illustrated, the block 11 is shown as having four faces to which the main spokes 8 are secured, though it will be evident that a block having the outline of any regular polygon could be utilized so as to increase or diminish the number of main spokes as circumstances may require. The block 11 is provided, at each corner, with a pair of spaced ears 13. These ears receive between them a sleeve 14 formed at the inner end of a supplemental spoke 15, a pin 16 being inserted through the ears and this sleeve, thus hingedly securing the inner end of the spoke to the corner of the block. The outer end of spoke 15 is pivotally secured between the ears 6 of a plate 4.

A coil expansion spring 19 is mounted about each pin 3 beneath or outside of the plates 4, a similar spring 17 being mounted about the pin above the plate and confined between the same and the jam nuts 18 threaded on the inner end of the pin. By this construction, the hub block 11 is resiliently supported so as to permit movement of the rim of the wheel toward and away from the same. If the wheel encounters an obstacle the shock will be absorbed by the springs 19, any excessive rebound being prevented by the springs 17. As will be noted from Fig. 1 of the drawings, the arms 9 of the main spokes 8 are not disposed radially of the wheel but are inclined toward each other and toward the radius which passes midway between these arms. Due to this fact, the arms 9 are disposed at such an angle to the hub block 11 so as to permit slight flexing or distortion thereof in cases of excessive loads, or when traveling over unusually rough surfaces. By this construction, the main spokes contribute materially to the resiliency of the wheel as a whole. As these spokes, and the supplemental spokes 15 each of which is shaped similar to one arm 9 of the main spokes 8, may be readily formed by stamping and bending from sheet material of suitable gage, this wheel may be easily produced at comparatively small cost.

What I claim is:

1. In a wheel, a hub-block of regular polygonal outline, a rim concentric therewith, and spokes formed from sheet material, each having outwardly tapering arms and a base connecting the inner ends of said arms, the arms of the spokes being inclined toward each other and having their outer ends secured to said rim, and the base of the spoke being secured to one face of the hub-block.

2. In a wheel, a hub-block of regular polygonal outline, a rim concentric therewith, supporting plates secured to said rim, each plate being provided at its center with a pair of spaced transverse ears, and spokes formed from sheet material each having outwardly tapering arms and a base connecting the inner ends of said arms and secured to one face of the hub-block, the outer ends of the arms of the spokes being brought together and secured between the ears of said supporting plate.

In testimony whereof I affix my signature in presence of two witnesses.

ROBERT V. REID.

Witnesses:
J. E. ADAM,
A. L. WATFORD.

Copies of this patent may be obtained for five cents each, by addressing the "Commissioner of Patents, Washington, D. C."